United States Patent [19]

Levine

[11] 4,019,053
[45] Apr. 19, 1977

[54] LETHAL WEAPON DETECTION PROCESS

[76] Inventor: Jeffrey C. Levine, 6235 Springhill Drive, Greenbelt, Md. 20770

[22] Filed: Oct. 14, 1975

[21] Appl. No.: 622,388

[52] U.S. Cl. .............................. 250/303; 250/304
[51] Int. Cl.² ...................................... G21H 5/02
[58] Field of Search ................. 250/302, 303, 304

[56] References Cited

UNITED STATES PATENTS

| | | | |
|---|---|---|---|
| 2,474,271 | 6/1949 | Meyer | 250/303 X |
| 3,255,352 | 6/1966 | Johnston | 250/303 |
| 3,358,602 | 12/1967 | Chope | 250/303 X |

OTHER PUBLICATIONS

Coding Documents by Trace Element Inclusion, from IBM Technical Disclosure Bulletin, vol. 11, No. 11; Apr. 1969, p. 1394.

*Primary Examiner*—Archie R. Borchelt
*Attorney, Agent, or Firm*—Paris, Haskell and Levine

[57] ABSTRACT

Methods of detecting the presence of concealed weapons and determining the type of weapons with a greater degree of certainty and reliability. The method involves tagging of the weapon with a radioactive marking that produces penetrative radiation, and providing radiation detectors at entrances to commercial and private residences, airlines, vehicles and other places. According to a preferred method, the tagging or marking of the weapon is in a form of a digital coding; and a different common coding is applied to each different kind of weapon. For example, hand guns receive a common code of one type; knives a different code; explosives a third different code, and the like.

10 Claims, No Drawings

LETHAL WEAPON DETECTION PROCESS

This invention relates to methods for detecting the presence of concealed weapons being carried by persons or concealed elsewhere; and is particularly directed to such methods wherein different types and kinds of concealed weapons can be detected with a high degree of reliability and certainty and the particular kind of weapon being concealed can also be determined.

BACKGROUND AND PRIOR ART

Many types of detectors, systems, and methods have been proposed for the purpose of warning of the presence of concealed dangerous weapons, such as handguns. In airports, for example, highly sensitive electromagnetic detectors, such as magnetometers, are being used for screening all on-going passengers to prevent the carrying aboard of concealed weapons such as knives, handguns and other dangerous objects. The luggage and packages being carried aboard are also usually visually inspected by guards, and/or passed through fluoroscopic x-ray detectors and/or other image producing inspection devices for the same purpose.

However, available screening devices and detecting methods require a human interpretation and intervention by trained persons, since conventional metal detectors are often triggered into operation by harmless metal objects, such as keys; and the available x-ray inspection devices often display the presence of shapes having suspicious outward appearances that are later found to be quite harmless objects.

Various commercial establishments including stores, shops, factories, and offices, as well as private dwellings, might also advantageously employ detection devices and systems for warning the occupants of the arrival or presence of visitors carrying dangerous weapons in a concealed manner. However known and available metal detectors, and other such known measuring devices, are not particularly suitable for such uses in being both too expensive for the average home or commercial store, and in requiring the use of reasonably skilled operators to manipulate and use such equipments so as to distinguish harmless objects from concealed dangerous weapons.

SUMMARY OF THE INVENTION

According to the present invention there is provided a more positive and reliable method of detecting and warning of the presence of concealed dangerous objects that may be employed for both commercial uses as well as in homes and elsewhere low cost and high reliability when used by unskilled persons are important considerations.

In brief, a preferred embodiment involves the marking or tagging of each dangerous weapon at the factory, or other place where it is sold or distributed, with a material, such as a radioactive material, that produces penetrative radiation that can be easily detected and distinguished over the usual ambient radiation. At the entrance way or exit of an area to be protected is provided a suitable detector and warning indicator that responds to the nearly presence of such radiation to provide a warning of the presence of a concealed dangerous weapon.

To distinguish and identify the presence of different types of weapons, the tagging or marking may be in the form of a code, with a different type or kind of code being pre-assigned and applied to each different kind of weapon to be identified. In such instance, the detector would be provided in a more elaborate form to not only detect and warn of the presence of such radiation from a concealed weapon, but additionally respond to the code and identify the type of secreted weapon being detected.

DETAILED DISCLOSURE OF A PREFERRED EMBODIMENT

In a preferred manner of practicing the method of this invention, each dangerous weapon or object that may be used as a weapon, is coded at the factory, at its place of distribution, or by the police or elsewhere, with a pre-assigned digital code of radioactive material that represents that particular kind of weapon or object and distinguishes that weapon or object from other objects. The code may be incorporated as a four digit bar code, or concentric circle code, or multiple dot code, or other coding that provides different numbers in either decimal form, binary form, or other number system. The particular kind and type of digital coding being selected is not in itself critical to the practice of the invention since its sole purpose is to identify and distinguish the hidden weapon by the code of penetrative radiation being produced. The manner of applying the code to the object is also not considered to be critical to the practice of the invention since the radioactive material may be applied as a coating to the object after its manufacture or may be incorporated integrally into the metal or material of the weapon during or after its manufacture, such as by diffusion.

It is important, of course, if this invention is to achieve optimum utilization and maximized benefit to the public, that a universal code be adopted by Governmental legislation to identify all dangerous weapons; and by legislation, that it be required that such radioactive material coding be applied in the manufacture or sale of all types of weapons, with a preselected different code for each type of weapon or object useful as a weapon. It is also desirable, of course, that the radioactive material be applied in such manner rendering it extremely difficult to remove or obliterate, such as incorporating radioactive material integrally by diffusion within the metal casting or other material of the weapon.

The quantity of radioactive material being used for coding need be very minute to produce penetrative radiation of a low level of intensity, far below the levels reported to be dangerous to humans. Such low level penetrative radiation is easily detachable by radioactive detectors that may be provided in doorway entrances, windows, and like places where the location of the detector is at a very short range or distance, (in the range of a few feet at most) from the person or container carrying the concealed weapon. Since the type of radiation produced, be it alpha, beta, gamma, or other, is so different from any normal ambient radiation to be expected at the location of the detectors, it is evident that the least complex and inexpensive radioactive detectors are required to positively and reliably determine the nearby presence of the concealed weapon.

To prevent counterfeiting, changing of the code, or confusing the code by persons unauthorized to do so, the codes may be comprised of the use of minute quantities of different tagging isotopes or radioactive materials so that each different type of weapon may produce a different code of various types of penetrative radiations. Such a manner of coding the articles would be rather inexpensive to provide at the factory or other central area where large numbers of objects are being manufactured or distributed, but would be quite difficult and costly to duplicate on an individual basis.

For detecting the penetrative radiations produced by the hidden weapon, the detectors may be of the more inexpensive types for home uses that merely detect the presence of the radioactive emanations from the weapons, without distinguishing the type of weapon. Alternatively where the costs are justified, the detectors may include appropriate circuitry for decoding the code and selectively operating an appropriate warning device or indicator to distinguish the type of weapon being detected.

It will be appreciated by those skilled in the art that in the practice of this method, the apparatus being employed will be selected corresponding to the use intended. For example, many hundreds of radioactive isotopes are known and available for marking or, tagging, or "tracer" purposes that produce detectable penetration radiation that may be employed in the method of this invention. An isotope such as CESIUM-137 may be employed in a digital code of spots. In small quantities, such as one micro-curie, it produces a low intensity gamma radiation, yet has a very long half life. It is also comparatively low in cost. Many other isotopes having similar characteristics may be employed including RADIUM 226, AMERICIUM 241 and others.

In providing a dot pattern of CESIUM-137 on a weapon, such as a handgun, a coating may be prepared by providing cesium choride powder in a liquid acrylic, and applying the liquid as coating in a dot pattern, or other coding, on the gun where it dries to provide an invisible code.

Diffusion of the radioactive isotope or isotopes into the metal of the gun, knives, or other material may be provided to insure a more permanent tagging that would be more difficult to obliterate or obscure. U.S. Pat. No. 3,620,794 discloses one manner of diffusing radioactive material into an object.

For purposes of the present invention those radioactive materials are preferred that are widely available, comparatively inexpensive, and commercially available in such form as may be incorporated within or diffused into the metal of guns and knives and other weapons or objects. Many radiation detectors are also available on the commercial market and the selection of the one or ones desired will depend upon the application or use of the method and the cost. Since in most applications of this invention the receiver or detector will receive but a brief exposure to the radiation produced as a person or object carrying the weapon passes through a doorway or the like, the detector will preferably be of the faster acting kind instead of the slower responding chemical types available. Detectors employing scintillation crystals and photomultiphers provide considerable sensitivity and may be used where the application involved justifies the cost.

It will be apparent that the code receivers or detectors may also be battery operated and portable adapted to be carried by a policeman, or other person; or in a police vehicle, to detect the presence of hidden weapons on the person of an accused criminal; or being hidden in a vehicle; or hidden in the premises of a dwelling. In such applications, the detector used may be of the more sensitive type having a longer range or distance of response so that hidden weapons can be located at a further distance insuring a greater margin of safety for the police.

In all of such application or uses of this invention, it will be recognized that the method provides greater reliability and assurance of positive detection of weapons by unskilled persons than does conventional detectors of the prior art that rely upon the use of magnetometers, metal detection, x-ray fluoroscope and like devices. These detectors respond to all objects of similar shape, size, metal content or material regardless of whether such objects are in fact dangerous weapons or innocuous articles. The present invention on the other hand responds only to a predetermined coding of radiation produced by radioactive materials, which radiation is not normally present at the location of the detectors.

Although the coding or pattern of radioactive material has been refered to as a "digital" code, it will be appreciated that a distinctive analog pattern may also be used to tag the weapons with a different pattern applied to each different kind of weapon.

What is claimed is:

1. A method of identifying and detecting a weapon that is concealed from view comprising the steps of:
   incorporating a radioactive marking material in the form of a coding in the weapon in a concealed manner that produces a non-visible code of radiation of sufficient intensity as to be detectable at a distance from the concealed weapon,
   detecting such code of radiations at each location where it is desired to detect such weapon, such a detector being provided at locations including one of entranceways into rooms, vehicles, places of entertainment, windows, and other entrances and exits.

2. In the method of claim 1, each different type of weapon being marked with a distinctively different code of radiation to distinguish the type of weapon being detected from weapons of other types.

3. In the method of claim 1, the additional step of indicating at said detector the type of weapon being detected.

4. In the method of claim 1, the marking material being incorporated in a manner to produce a digital code of penetrative radiation with weapons of the same type having the same code and weapons of different type having a different code, whereby upon detection, the type of weapon that is concealed may be known.

5. In the method of claim 1, the step of incorporating the marking material comprising integrally incorporating such marking in the weapon to deter obliteration of the marking.

6. In the method of claim 1, the step of incorporating the marking material comprising applying the material as a non-visible coating on the weapon.

7. In the method of claim 1, the coding being provided by applying a plurality of different radio-active materials to the weapon.

8. In the method of claim 1, the coding being a different digital code for each different kind of weapon.

9. In the method of claim 1, the coding being a different analog pattern for each different kind of weapon.

10. In the method of claim 1, the detecting of said code being performed by a portable detector that can be moved relative to the concealed weapon to determine the location of the concealed weapon.

* * * * *